US00RE36841E

United States Patent [19]

Arimoto et al.

[11] E Patent Number: Re. 36,841

[45] Reissued Date of Patent: Aug. 29, 2000

[54] MULTI-BEAM LASER PRINTER WITH BEAM SPACING DETECTION DURING BLANKING TIME

[75] Inventors: Akira Arimoto, Musashimurayama; Susumu Saito, Hachioji; Takeshi Mochizuki, Mito, all of Japan

[73] Assignee: Hitachi, Ltd., Tokyo, Japan

[21] Appl. No.: 08/755,656

[22] Filed: Nov. 25, 1996

Related U.S. Patent Documents

Reissue of:

[64] Patent No.: 4,725,855
Issued: Feb. 16, 1988
Appl. No.: 07/854,947
Filed: Apr. 23, 1986

U.S. Applications:

[63] Continuation of application No. 07/480,935, Feb. 16, 1990, abandoned.

[30] Foreign Application Priority Data

Apr. 25, 1985 [JP] Japan ..... 60-86446

[51] Int. Cl.[7] ..... B41J 2/435

[52] U.S. Cl. ..... 347/250; 347/257; 358/296

[58] Field of Search ..... 347/250, 257; 346/107.1, 107.4; 358/296, 480, 481

[56] References Cited

U.S. PATENT DOCUMENTS 4,404,521 9/1983 Kitamura ..... 346/76 L
4,622,564 11/1986 Kaku ..... 346/107 R

*Primary Examiner*—N. Le
*Assistant Examiner*—L. Anderson
*Attorney, Agent, or Firm*—Antonelli, Terry, Stout & Kraus, LLP

[57] ABSTRACT

In a laser printer wherein a photoconductive drum is scanned by utilizing a plurality of laser beams, there are detected spacings between the plural laser beams, such detection being confined to a blanking time. On the basis of the detected results, the spacings between the plural laser beams are controlled; and this state is maintained for a printing time. With this arrangement, it is possible to accurately detect the spacings between the plural laser beams thereby to obtain the practicable laser printer employing the plural laser beams.

39 Claims, 2 Drawing Sheets

MULTI-BEAM LASER PRINTER WITH BEAM SPACING DETECTION DURING BLANKING TIME

Matter enclosed in heavy brackets [ ] appears in the original patent but forms no part of this reissue specification; matter printed in italics indicates the additions made by reissue.

*This application is a continuation application of Ser. No. 07/480,935, filed Feb. 16, 1990, now abandoned, which is a reissue application of U.S. application Ser. No. 06/854,947, filed on Apr. 23, 1986, now U.S. Pat. No. 4,725,855, issued Feb. 16, 1988.*

BACKGROUND OF THE INVENTION

The present invention relates to a laser printer which is capable of printing high grade characters and images by scanning laser beams.

A conventional laser printer whose printing velocity is medium or low usually utilizes a single diode laser beam. On the other hand, a printer in which the printing is effected at an extra-high speed is at present arranged such that the single gas laser beam is intactly employed, or this single gas laser beam is divided into plural gas laser beams by means of an acoustic optical deflector; and both the frequency band region of a modulator and the rate at which a rotating polygonal mirror rotates are reduced by scanning the plural gas laser beams simultaneously.

In either case, however, so far as the gas laser is employed as mentioned above, it is impossible to steer clear of the large consumption of electricity and miniaturize the apparatus. Under such circumstances, there is recently focussed an introduction of a semiconductor laser which is capable of executing direct modulation for itself. However, this kind of semiconductor laser involves defects wherein the wavelength thereof is 1.5~2-fold as long as that of the gas laser, which requires a large-sized configuration of the rotating polygonal mirror, and it has been quite difficult to constitute a laser printer by using a single laser beam on account of deteriorated photoconductivity which responds to a long wavelength of the foregoing semiconductor laser.

Such being the case, there is a growing expectation in a method where parallel scanning is effected by making use of a plurality of semiconductor laser beams. Some means for actualizing this end have been disclosed in the specifications of U.S. patent application No. 680497, West German patent application No. P3445751.8, U.S. patent application No. 804940 and West German patent pplication No. P3543472.4 with which some of the inventors of the present invention are associated. However, provided that the printing is performed during the detection of the spacings between plural semiconductor laser beams, it is inconveniently unfeasible to accurately detect it.

SUMMARY OF THE INVENTION

Accordingly, it is a primary object of the present invention which obviates the above-described problems to provide a laser printer which is capable of precisely detecting spacings between a plurality of laser beams thereby to control the desired spacings. To accomplish this end, the present invention is characterized such that there is prescribed a timing at which to detect the spacings between the aforementioned plural laser beams.

DETAILED DESCRIPTION OF THE PREFERRED EMBODIMENTS

Figure 1:
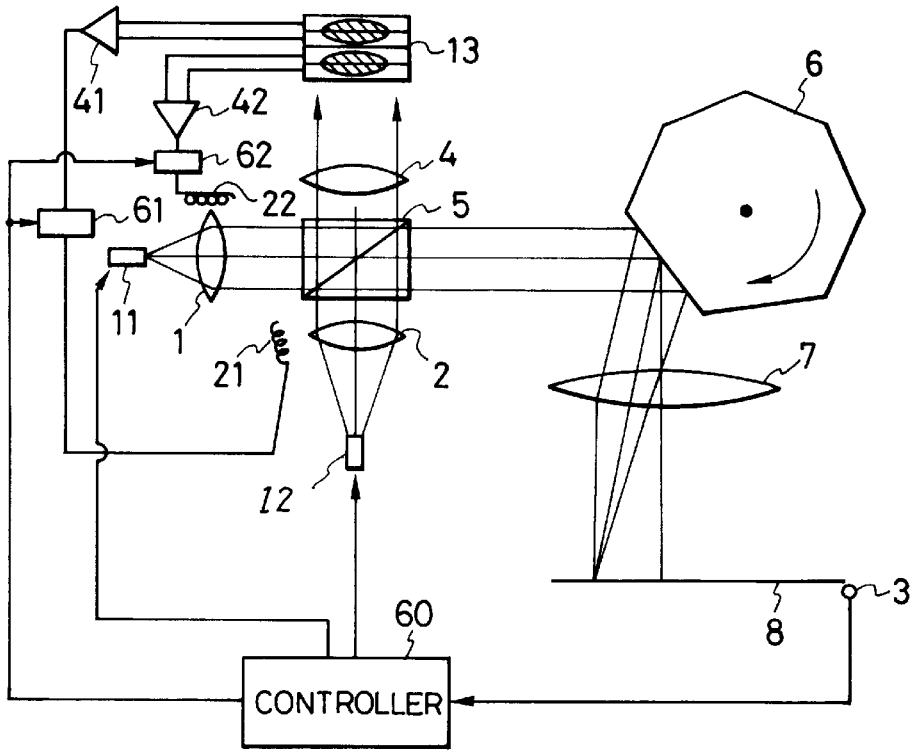
FIG. 1 is a view showing a constitution of a laser printer of one embodiment according to the present invention, the laser printer utilizing a plurality of laser beams to control the spacings therebetween.

Referring now to FIG. 1, there is shown a laser printer which employs two semiconductor lasers of one embodiment according to the present invention.

Laser beams respectively emitted from two lasers 11, 12 pass through a synthesizing prism 5 where the laser beams are synthesized in the same direction at such a spacing that the two laser beams slightly deviate from each other. In the wake of this, the beams are directed toward a rotating polygonal mirror 6 and then turns to an Fθ lens 7 serving as a scanning lens. On a photoconductive drum 8, the two laser beams are adjusted to a predetermined spacing, and at the same time, it is required to render this spacing immutable. As shown in FIG. 1, for this purpose is proposed an apparatus in which the spacing between the two laser beams is read with the aid of a divided detector 13 by making use of the light which is partially leaked out of the prism 5 designed for synthesizing the beam; and the above-described spacing is controlled by virtue of the resultant signal.

The laser printer employing the semiconductor, however, creates the following drawback. It is feasible for the laser itself to modulate at a printing time, so that the modulated light enters the divided detector 13. As a result, intensity of the laser beams varies and hence it is difficult to detect the position thereof. Consequently, as for the present invention, the arrangement is such that the detection is carried out within a blanking time for which the printing is not effected; the spacings between the laser beams are controlled on the basis of the thus detected results; and this state is maintained in a printing time. If the rotating polygonal mirror is commonly used, an angle at which the light is theoretically able to scan in the case of an n-faced mirror can be given by:

$$360/n$$

Inasmuch as the light which is incident upon the rotating polygonal mirror usually has a specified magnitude, it is common that the actual angle at which the photo-scanning is performed on the polygonal mirror comes to 60–70% of the above-described theoretical value.

Figure 2:
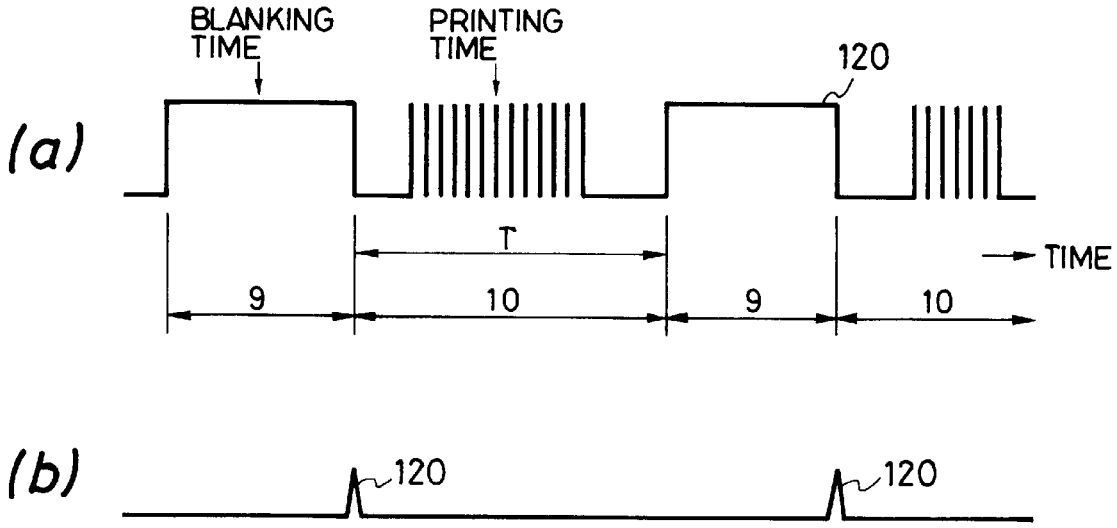
FIG. 2 is a view showing the timing at which locations of the laser beams relative to this invention are detected.

Accordingly, a period of 60–70% is, as described above, employed for printing, whereas a period of 30–40% is defined as non-scanning time. Generally speaking, this non-scanning time is considered to be rather disadvantageous, since effective utilization of the laser beams is unfeasible during this time. The present invention, however, is characterized in detecting the position by setting the two laser beams in a state of "ON" for this blanking time. FIG. 2(a) shows the timing relative to modulation of semiconductor lasers (marked with 11, 12 in FIG. 1) of an embodiment according to the present invention. Namely, in case that the positional control is conducted with respect to the two laser beams which are respectively emitted from the semiconductor lasers 11, 12 by the use of a signal (hereinafter referred to as a spacing error signal) which is detected for the blanking time, it is, as mentioned before, not easy to obtain the spacing error signal for the printing time. Hence the so-called sample holding mode is adopted, wherein the aforecited positional control is performed by using the spacing error signal obtained for the blanking time only, and such a state is arranged to be kept for the printing time. A blanking time 9 can be detected as follows. It can be observed through FIG. 1 that the photodetector 3 is disposed outside a print starting position on the scanning line for the laser beam, this photodetector 3 being designed for setting the start timing at which the laser beam is scanned. To be specific, the time just when the scanning laser beam passes through the photodetector 3 is defined as the scanning start timing. The timing positions are indicated by the reference numeral 120 in FIGS. 2(a), 2(b). It is to be noted that FIG. 2(b) shows the timing of an output signal emitted from the photodetector 3. A width T of a scanning period 10 for which the scanning is effected with respect to a predetermined width measured from the point 120 is expressed such as:

$$T=L/(4\pi nf)$$

where L is the printing width of a rotating polygonal mirror, n is the number of revolution thereof, and f is the focal length of the Fθ lens 7 employed therein. After traversing the width T, the blanking time 9 is present. For this period, the laser beam continue to light up on direct current. Namely, the blanking time 9 is a time till the laser beam in the next scanning plan comes to the photodetector 3 again. The divided type photodetector 13 detects the spacing error for the blanking time. A configuration of such a photodetector is, as described at full length in the specifications of U.S. patent application Ser. No. 680,497 or West German patent application No. P3445751.8, typified by that of the photodetector 13 shown in FIG. 3. The photodetector 13 is constituted by two pairs of divided detectors 141, 142 and 143, 144 and is arranged to read the positions of the respective laser beams by a differential motion.

Figure 3:
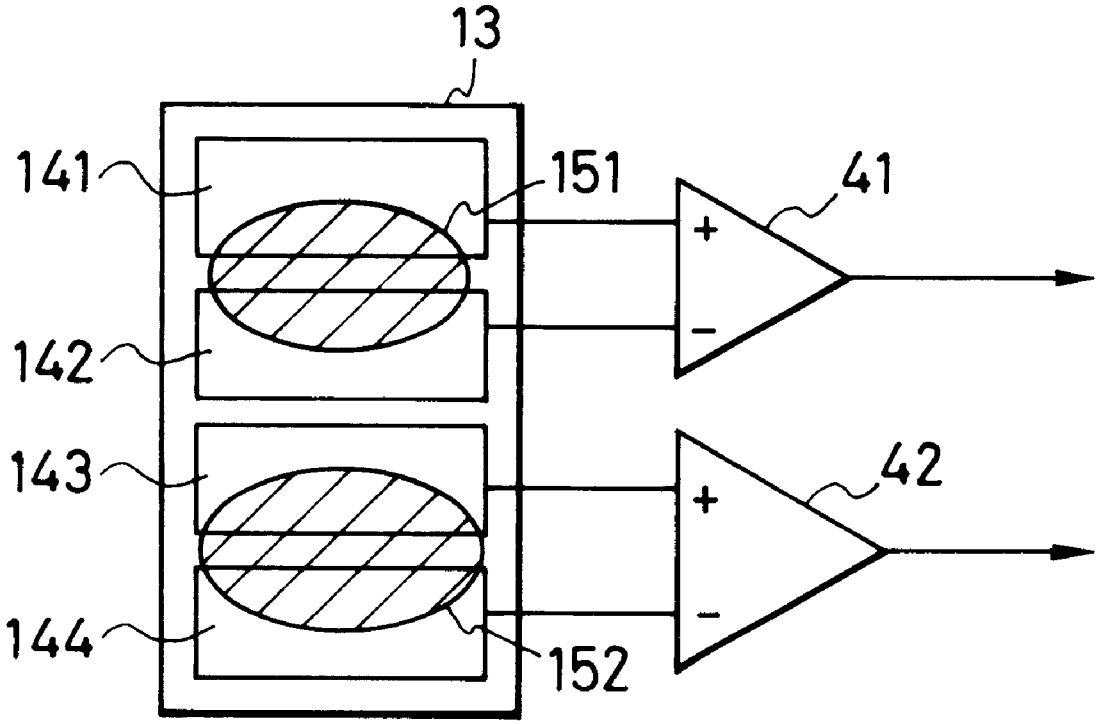
FIG. 3 is a view showing a constitution of a photodetector for detecting the spacings between the plural laser beams relative to the present invention.

In FIG. 3, suppose that the laser beams on the detectors 151, 152 are so located as to be impartially applied to the divided detectors 141, 142 and 143, 144, the foregoing differential output is zero. However, if the beams are located so that they are asymmetrically applied thereto, there appears a differential signal which displays the differential output corresponding to the positions of the laser beams. Consequently, there are provided controllers 61, 62 consisting of, for example, a gain adjusting unit or the like which has a function to effect a negative feedback with a view to controlling actuators 21, 22. With this arrangement, the differential signal remains to be zero, this signal being obtained by means of differential devices 41, 42 (for instance, a differential amplifier or the like) shown in FIG. 1.

Coupling lenses 1, 2 are moved by dint of the motion of the actuators 21, 22 in such a way that the surfaces of the lenses are so directed to be perpendicular to the optical axes, whereby two spots irradiated with the laser beams are adjusted in order that no positional deviation is produced.

With the aid of the signals (See FIG. 2(b)) created when the scanning laser beams shown in FIG. 1 passes through the detector 3, the controller 60 shown in the same Figure performs controlling operations with respect to "ON" and "OFF" of the laser beam, the sample holding processing, detection of the spacing error signal and the timing of various kinds of operations as in the case of the actuators 21, 22 by which the above-described differential signal comes to zero.

As can be clarified from the description thus far made, the present invention yields the following effects.

An output-load of the laser for use is reduced by executing the positional control of the aforementioned laser beams. Moreover, it is feasible to actualize an extra-speed laser printer which is capable of effectively decreasing a light modulation frequency of the laser.

What is claimed is:

1. A laser printer comprising: a source for generating a plurality of laser beams;

an optical device deflecting said plural laser beams for scanning;

a printing photoconductive drum scanned simultaneously and parallelly by specific irradiation of said [polarized] *plural* laser beams;

a detector for optically detecting deviation in spacings between said plural laser beams by making use of part of said plural laser beams; and actuators for adjusting spots irradiated with said plural laser beams in response to an output signal of said detector, wherein there is provided a controller which performs a controlling operation so that the detection of positional deviation relative to the spacings between said laser beams is carried out only for a blanking time associated with said laser printer.

2. A laser printer as set forth in claim 1, wherein operational timing of a controlling means for detecting said blanking time is effected with the aid of an output signal of a photodetector for detecting a scanning start point provided in the vicinity of a print starting position on the scanning line for said laser beam on said printing photo conductive drum.

3. A laser printer as set forth in claim 1, wherein said source for generating said plural laser beams is constituted by a plurality of semiconductor lasers.

4. A laser printer as set forth in claim 1, wherein said controller controls said source for generating a plurality of laser beams so that said laser beams are in the ON condition without intensity variation thereof during said blanking time so as to enable accurate detection of positional deviation relative to the spacings between said laser beams.

*5. A laser printer as set forth in claim 3, wherein there is provided a prism for synthesizing said plural laser beams from said source in the same direction at such spacings that said plural laser beams slightly deviate from each other.*

*6. A laser printer as set forth in claim 5, wherein said detector receives beams which are partially taken out of said prism.*

*7. A laser printer as set forth in claim 1, wherein there is provided a scanning lens between said optical device for deflecting said plural laser beams and said printing photoconductive drum.*

*8. A laser printer as set forth in claim 7, wherein said scanning lens is an Fθ lens.*

*9. A laser printer as set forth in claim 1, wherein said optical device is a rotating polygonal mirror.*

*10. A laser printer comprising:*

*a plurality of semiconductor lasers generating a plurality of laser beams;*

*a prism synthesizing said plural laser beams in the same direction and with slightly deviated positions from each other;*

*a deflector deflecting said plural beams for scanning;*

*a photoconductive element scanned parallely on the surface thereof by said plural laser beams;*

*a detector detecting deviation between said plural laser beams on said surface by part of said plural laser beams; and*

*actuators adjusting the positions of said plural laser beams from each other on said surface in accordance with said detected deviation within a blanking time of said laser printer.*

*11. A laser printer as set forth in claim 10, wherein there are provided a photodetector which detects each printing start timing for scanning lines on said surface of said photoconductive element and a controller which is connected to said actuators and said photodetector, said controller controlling operations of said actuators in accordance with an output signal of said photodetector so that the positions of said plural laser beams on said surface are adjusted in accordance with said detected deviation within a blanking time of said laser printer and are kept for a printing time of said laser printer.*

*12. A laser printer as set forth in claim 11, wherein said controller is connected to said plural semiconductor lasers and controls said plural semiconductor lasers so that said laser beams are in the ON condition within said blanking time in order to detect the deviation between said laser beams.*

*13. A laser printer as set forth in claim 11, wherein said detector receives beams which are partially taken out of said prism.*

*14. A laser printer as set forth in claim 11, wherein there is provided a scanning lens between said deflector and said photoconductive device.*

*15. A laser printer as set forth in claim 14, wherein said scanning lens is an Fθ lens.*

*16. A laser printer as set forth in claim 11, wherein said deflector is a rotating polygonal mirror.*

*17. A laser printer as set forth in claim 11, wherein said detector has a plurality of segments combined with each other so as to receive respective images of said plural laser beams and detects the deviation between said plural laser beams on the basis of a relation between the segments.*

*18. A laser printer comprising:*

*a source for generating a plurality of laser beams;*

*a deflector deflecting said plural laser beams for scanning;*

*a photoconductive device scanned parallely on the surface thereof by said plural laser beams;*

*a detector detecting deviation between said plural laser beams on said surface by part of said plural laser beams;*

*actuators connected to said detector and adjusting the positions of said plural laser beams on said surface in accordance with said detected deviation within a blanking time of said laser printer;*

*a photodetector detecting a predetermined position corresponding to each start position of an effective part of said surface for printing; and*

*a controller connected to said actuators and said photoconductor, said controller controlling the operations of said actuators in accordance with an output signal of said photodetector so that the positions of said plural laser beams on said surface are kept for a printing time of said laser printer.*

*19. A laser printer as set forth in claim 18, wherein said photodetector is provided to receive said laser beams deflected by said deflector.*

*20. A laser printer as set forth in claim 18, wherein said source for generating said plural laser beams is constituted by a plurality of semiconductor lasers.*

*21. A laser printer as set forth in claim 18, wherein said controller is connected to said source for generating a plurality of laser beams and controls said source for generating a plurality of laser beams so that said laser beams are in the ON condition within said blanking time so as to detect the deviation between said laser beams.*

*22. A laser printer as set forth in claim 20, wherein there is provided a prism between said semiconductor lasers and said deflector, said prism synthesizing said plural laser beams from said plural semiconductor lasers in the same direction at spacings such that said plural laser beams slightly deviate from each other.*

*23. A laser printer as set forth in claim 22, wherein said detector receives beams which are partially taken out of said prism.*

*24. A laser printer as set forth in claim 18, wherein there is provided a scanning lens between said deflector and said photoconductive device.*

*25. A laser printer as set forth in claim 18, wherein said deflector is a rotating polygonal mirror.*

*26. A laser printer as set forth in claim 18, wherein said detector has a plurality of segments combined with each other so as to receive respective images of said plural laser beams and detects the deviation between said plural laser beams on the basis of a relation between the segments.*

*27. A laser printer comprising:*

*a source for generating a plurality of laser beams;*

*a deflector deflecting said plural laser beams for scanning;*

*a photoconductive device scanned parallely on the surface thereof by said plural laser beams;*

*a detector having a plurality of segments combined with each other so as to receive respective images of said plural laser beams and detecting deviation between said plural laser beams and said surface, on the basis of a relation between the segments;*

*means for maintaining the deviation between said plural laser beams by a negative feedback control operation using said detected deviation so that the positions of said plural laser beams on said surface are held in a predetermined relation;*

*a photodetector provided in the vicinity of said photoconductive device for detecting a position corresponding to each start position of said surface for printing; and*

*a controller connected to said maintaining means, said source and said photodetector, said controller controlling the operation of said maintaining means so that said negative feedback control operation is kept during a printing time of said laser printer and controlling said source so that said laser beams are in the ON condition within a period other than said printing time so as to detect the deviation between said laser beams, in accordance with an output signal of said photodetector.*

*28. A laser printer as set forth in claim 27, wherein said maintaining means includes actuators which are driven in accordance with outputs of said segments.*

*29. A laser printer as set forth in claim 27, wherein said source for generating said plural laser beams includes a plurality of semiconductor lasers.*

*30. A laser printer as set forth in claim 27, wherein said photoconductor is disposed so as to receive said laser beams deflected by said deflector.*

*31. A laser printer as set forth in claim 29, wherein said controller controls said semiconductor lasers so that said laser beams are in the ON condition within said period.*

*32. A laser printer as set forth in claim 29, wherein there is provided a prism between said semiconductor lasers and*

*said deflector, said prism synthesizes said plural laser beams from said plural semiconductor lasers in the same direction and with positions slightly deviated from each other.*

*33. A laser printer as set forth in claim 32, wherein said detector receives beams which are partially taken out of said prism.*

*34. A laser printer as set forth in claim 27, wherein there is provided a scanning lens between said deflector and said photoconductive device.*

*35. A laser printer as set forth in claim 27, wherein said deflector is a rotating polygonal mirror.*

*36. A laser printer comprising:*

*two semiconductor lasers;*

*a prism synthesizing two laser beams generated from said two semiconductor lasers in the same direction and with positions slightly deviated from each other;*

*a deflector deflecting said two laser beams for scanning;*

*a photoconductive device scanned parallely on the surface thereof by said two laser beams;*

*a detector which has a plurality of segments combined with each other so as to receive respective images of said two laser beams by part of said two laser beams, and which detects a deviation between said two laser beams on said surface on the basis of a relation between the segments;*

*actuators adjusting the positions of said two laser beams on said surface in accordance with said detected deviation;*

*a photoconductor provided in the vicinity of said photoconductive device to receive said laser beams deflected by said deflector and detecting a position corresponding to each start position of said surface for printing; and*

*a controller connected to said actuators, said semiconductor lasers and said photodetector, said controller controlling the operations of said actuators so that the positions of said two laser beams on said surface are kept for a printing time of said laser printer and controlling said semiconductor lasers so that said two laser beams are in the ON condition within a blanking time of said laser printer so as to detect the deviation between said two laser beams, in accordance with an output signal of said photodetector.*

*37. A laser printer as set forth in claim 36, wherein said detector receives beams which are partially taken out of said prism.*

*38. A laser printer as set forth in claim 36, wherein there is provided a scanning lens between said deflector and said photoconductive device.*

*39. A laser printer as set forth in claim 36, wherein said deflector is a rotating polygonal mirror.*

* * * * *